United States Patent [19]

Castagna et al.

[11] Patent Number: 6,058,699
[45] Date of Patent: May 9, 2000

[54] EXHAUST GAS DEPOLLUTION SYSTEM AND PROCESS

[75] Inventors: Franck Castagna; Pascal Hayrault, both of Rueil-Malmaison; Eric Jeudy, Achéres, all of France

[73] Assignee: Institut Francais Du Petrole, Cedex, France

[21] Appl. No.: 08/974,166

[22] Filed: Nov. 19, 1997

[30] Foreign Application Priority Data

Nov. 19, 1996 [FR] France .................................. 96 14185

[51] Int. Cl.[7] ...................................................... F01N 3/00
[52] U.S. Cl. ................................................ 60/284; 60/297
[58] Field of Search ........................... 60/274, 297, 284; 422/169, 170; 423/213.7

[56] References Cited

U.S. PATENT DOCUMENTS

| | | |
|---|---|---|
| 3,619,127 | 11/1971 | Hass . |
| 5,102,634 | 4/1992 | Hayashi et al. . |
| 5,417,947 | 5/1995 | Hertl et al. ............................. 423/213.7 |
| 5,582,003 | 12/1996 | Patil et al. .................................. 60/284 |
| 5,584,177 | 12/1996 | Oketanl et al. ............................ 60/297 |
| 5,662,869 | 9/1997 | Abe et al. ................................... 60/297 |
| 5,711,147 | 1/1998 | Vogtlin et al. ........................... 422/169 |
| 5,787,707 | 8/1998 | Hertl et al. ................................. 60/297 |

FOREIGN PATENT DOCUMENTS

| | | |
|---|---|---|
| 0661098 | 7/1995 | European Pat. Off. . |
| 0691459 | 1/1996 | European Pat. Off. . |
| 4326121 | 2/1995 | Germany . |
| 1337381 | 9/1987 | Russian Federation . |

OTHER PUBLICATIONS

"Inhibition of Post–Combustion Catalysts by Alkynes: A Clue for Understanding Their Behaviour Under Real Exhaust Conditions", by G. Mabilon et al, appearing in *Studies In Surface and Science and Catalysis*, Vo. 96 (1995), pp. 775–788.

Primary Examiner—Thomas Denion
Attorney, Agent, or Firm—Antonelli, Terry, Stout & Kraus, LLP

[57] ABSTRACT

The invention is a depollution system and a depollution processor for eliminating pollutants from exhaust gas from spark-ignition internal combustion engines. A depollution system which processes exhaust gas from a spark-ignition internal-combustion engine in accordance with the invention comprises at least a first gas processing device including a three-way catalyst placed in an exhaust line, a second device in the exhaust line through which all the exhaust gas passes and are processed therein which eliminates alkynes in the exhaust gas which interfere with operation of the three-way catalyst in removing pollutants from the exhaust gas, the second device being placed upstream from the first device in relation to a direction of propagation of the gases in the exhaust line and which lowers a temperature at which the first device starts eliminating the pollutants by catalysis relative to a temperature at which the first device starts eliminating pollutants by catalysis when alkynes are present in the exhaust gas.

9 Claims, 1 Drawing Sheet

EXHAUST GAS DEPOLLUTION SYSTEM AND PROCESS

BACKGROUND OF THE INVENTION

1. Field of the Invention

The present invention relates to the field of depollution of the exhaust gas notably discharged by vehicles equipped with spark-ignition engines.

2. Description of the Prior Art

In most industrialized countries, increasingly stringent standards are applied as regarding atmospheric pollutant discharges by motor vehicles. The regulated pollutants are notably carbon oxide (CO), nitrogen oxides ($NO_x$) and various unburned hydrocarbons.

Well-known depollution systems can be redox catalysts such as three-way catalysts placed in the exhaust line of vehicles. The problem posed by these systems is that they are effective only from a given exhaust gas temperature, generally of the order of 300° C.

Under cold conditions, most of the well-known catalysts thus do not remove all of the pollutants and notably the totally or partly unburned hydrocarbons which are therefore discharged in great amounts to the atmosphere. In fact, it is well-known that more than 80% of the unburned hydrocarbons are discharged during the first two minutes of a standard emissions discharge evaluation cycle.

Various means are thus investigated to eliminate the pollutants under cold conditions, i.e. from the starting of the vehicle to the time when the exhaust gases reach about 300° C., a time when conventional catalysts are initiated.

Patent application EP-A1-0,691,459 discloses a depollution system comprising a three-way catalyst interposed between a hydrocarbon polymerization catalyst placed upstream and a hydrocarbon adsorber placed downstream. This system changes hydrocarbons of low molecular weight, i.e. of small size, into hydrocarbons of higher molecular weight. The latter are more readily trapped at the level of the hydrocarbon adsorber.

In document DE 4,326,121, an adsorbent is provided to "clean" the pollutants from the exhaust gases throughout the catalytic activity.

The problem with such systems is that they have no influence on the initiation of the three-way catalyst. They only allow either an increase the amount of hydrocarbons trapped for a given lapse of time, or prolonging the life of the catalyst. Nothing is provided in this prior art to solve the cold start-up problem when the exhaust cases are not hot enough to initiate the catalyst.

Also known are exhaust lines equipped with a first catalytic muffler, known as light-off muffler, placed in the exhaust line as close as possible to the engine, which is initiated at a first temperature of the exhaust gases at the engine outlet. A second catalytic muffler is placed behind the first one and is initiated at a second temperature above the first temperature.

Problems linked with light-off catalyst wear arise generally quite rapidly with such exhaust lines.

Besides, in well-known systems using a hydrocarbon adsorber, the latter is intended to trap the hydrocarbons while the exhaust gases become hot enough to initiate the conventional oxidation catalyst.

SUMMARY OF THE INVENTION

The present invention functions according to a different procedure which initiates the three-way catalyst earlier than in well-known systems. In other words, the invention improves the performances of three-way catalysts, notably at low temperatures. The objective is not a permanent, long-term action but a more limited effect that exists only below a certain exhaust gas temperature threshold.

This effect and others are reached by means of a depollution system used for the exhaust gases of a spark-ignition internal-combustion engine, comprising at least a first gas processing device such as a three-way catalyst placed in the exhaust line.

According to the invention, the depollution system also comprises a second device placed upstream from the first device in relation to the direction of propagation of the gases in the exhaust line, which eliminates the inhibitors of the catalytic chemical reaction carried out by the first device, which allows lowering of the temperature at which the pollutants are eliminated by the first device.

More particularly, the second device eliminates the alkynes present in the exhaust gases. Acetylene is more particularly the compound eliminates by the invention since this compound is the most present in alkynes.

Advantageously, the second alkyne elimination device acts within an exhaust gas temperature range between 200° C. and 300° C.

According to an embodiment of the invention, the second device allows hydrogenation of the alkynes and notably of the acetylene present in the exhaust gases.

The second device can be, for example, a catalyst containing mainly palladium.

According to another embodiment of the invention, the second device comprises an adsorbent of at least one of the inhibitors of the catalytic reaction carried out by said first device.

Particularly, the second device can comprise an adsorbent of an alkyne such as acetylene. The adsorbent can be a palladium-doped zeolite.

The invention further relates to a depollution process intended for the exhaust gases of a spark-ignition internal-combustion engine, comprising catalysis performed in the exhaust line.

According to the invention, the process further eliminates the catalytic reaction inhibitors in order to lower the temperature from which the pollutants are eliminated by catalysis.

Advantageously, the alkynes present in the exhaust gases are eliminated upstream from the catalysis.

According to one of the embodiments of the invention, the process hydrogenates the alkynes and notably the acetylene present in the exhaust gases upstream from the catalysis.

By way of example, a catalyst containing mainly palladium is used to hydrogenate the alkynes and notably the acetylene.

Specifically, the elimination of the exhaust gas components which have an inhibiting effect at temperatures below 300° C. on the catalytic reaction is performed by the first means.

According to another embodiment of the invention elimination of the catalysis inhibitors is by the adsorption of the alkynes and notably of the acetylene present in the exhaust gases.

To that effect, a palladium-doped zeolite can be used.

BRIEF DESCRIPTION OF THE DRAWINGS

Other details, features and advantages of the present invention will be clear from reading the description hereafter, with reference to the accompanying drawings wherein.

DESCRIPTION OF THE PREFERRED EMBODIMENTS

Figure 1:
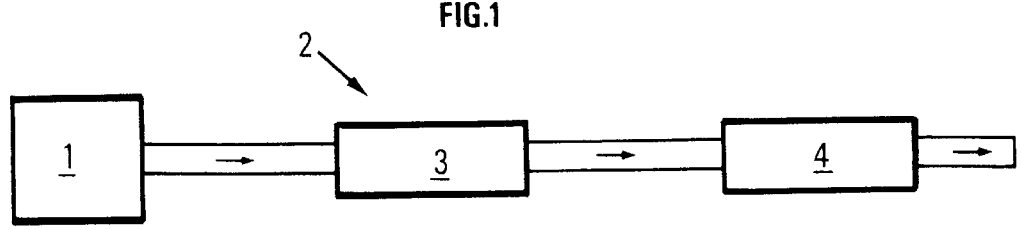
FIG. 1 is a simplified diagram of an exhaust line according to the invention.

FIG. 1 illustrates in a particularly simple way an exhaust line comprising a depollution system according to the invention.

The engine is a spark-ignition engine 1. The exhaust line 2 mainly comprises a first gas processing device 4 such as a three-way catalyst known in the art.

According to the invention, a second device 3 is placed upstream from the first device in relation to the direction of propagation of the gases in exhaust line 2. The arrows show this direction of flow.

Figure 2:
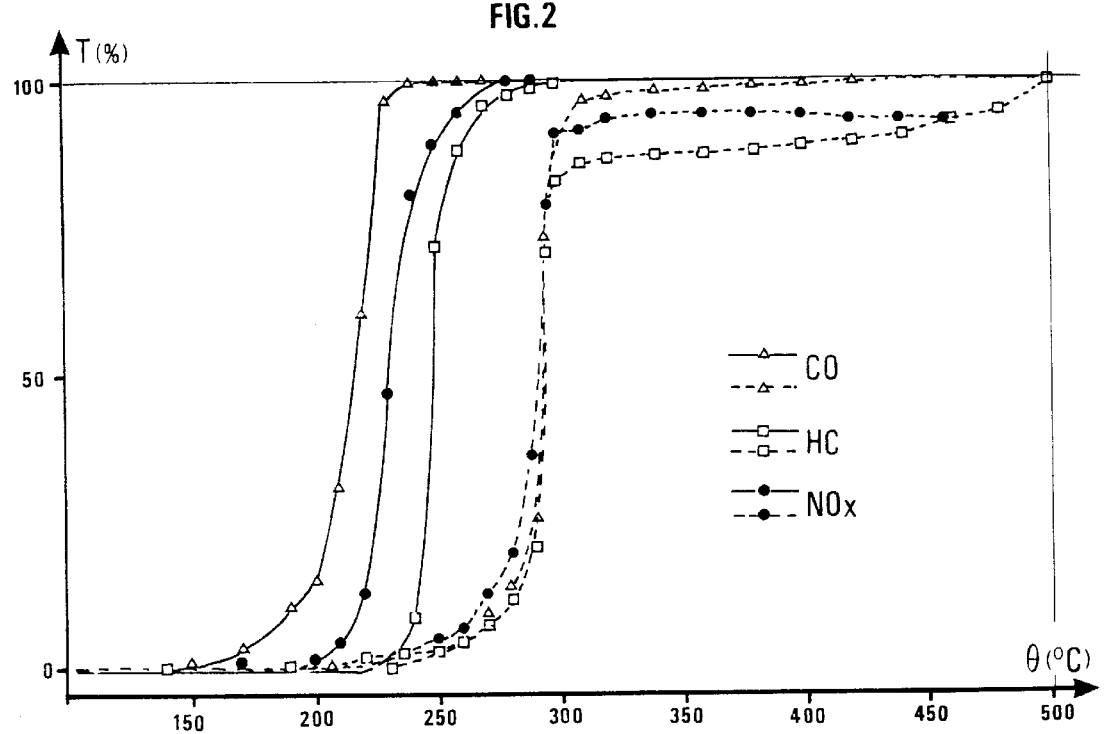
FIG. 2 is a set of curves showing the effect of an acetylene hydrogenation catalyst on the initiation of a three-way catalyst.

The purpose of the second device is to eliminate the inhibitors of the catalytic chemical reaction carried out in the first device 4. Thus, as shown by the curves of FIG. 2, the temperature from which the first device reacts is lower than in the prior art. In other words, the pollutants are eliminated, in the present case oxidized, by the first device as soon as the exhaust gases reach a given temperature below the usual light-off. The curves which will be commented on hereafter illustrate the gains which are achieved.

More precisely, according to the invention the second device 3 eliminates the alkynes and more particularly the acetylene which would otherwise reach the first device 4. In fact, it has been shown for example in the article entitled "Inhibition of Post-Combustion Catalysts by Alkynes" by G. Mabilon, D. Durand and P. Courty, published in "Catalysis and Automotive Pollution control III", Vol. 96, in 1995, that acetylene (notably) inhibits the various catalytic reactions.

Acetylene elimination according to the invention will consequently allow to initiate the three-way catalyst earlier than before.

Under standard conditions, acetylene elimination is preferably performed by device 3 between 200° C. and 300° C., this range being however given by way of example.

In other words, the invention prevents passage of acetylene (notably) through the three-way catalyst 4 up to a temperature of about 300° C. in order to prevent the aforementioned inhibition phenomenon. Acetylene being absent from the gas passing through means 4, the latter will be initiated at a lower temperature, about 220–250° C., producing a notable gain. The effect obtained according to the invention is thus of chemical nature; it is an effect advantageously limited to a certain temperature range.

Acetylene elimination by device 3 can be performed in different ways:

According to an embodiment of the invention, device 3 allows to hydrogenation of the acetylene present in the exhaust gases, at the outlet of engine 1. Since the exhaust gases of a spark-ignition engine contain hydrogen, device 3 can fulfil this hydrogenation function.

Catalysts mainly containing palladium could be used to that effect It should be noted that such a catalyst placed upstream from the well-known catalyst does not need to be a good oxidation catalyst. It must above all be capable of hydrogenating acetylene, notably below 300° C.

By way of example, a catalyst such as that described in one of patents FR-2,720,956, FR-2,720,957 or FR-2,721,019 assigned to the assignee of the present invention.

Another way to prevent acetylene from passing through device 4 can consist is passing the exhaust gases (upstream from device 4) through an adsorbent having the property of adsorbing the acetylene present at a temperature below 300° C.

Unlike the prior art, the aim here is not to adsorb the acetylene for a long time in order to delay the arrival of the pollutants on the three-way catalyst 4. It is, according to the invention, to adsorb the acetylene earlier, i.e. for temperatures below 300° C. for example, which is the usual light-off of three-way catalysts. This allows the three-way catalyst to be initiated earlier.

A palladium-doped zeolite can be used.

The curves of FIG. 2 clearly show the improvement produced by the invention.

These curves show the conversion coefficient T of various constituents of the exhaust gases as a function of the temperature θ of the exhaust gases.

FIG. 2 shows two series of curves: one, in dotted line, relates to the prior art and the other, in full line, relates to the present invention.

In each series, the lines comprising triangles relate to CO emissions, the lines with squares relate to hydrocarbon emissions and the lines comprising black dots relate to nitrogen oxide emissions ($NO_x$).

The curves in dotted line show a global conversion above 50% for temperatures above 300° C. Catalyst 4 is thus initiated from this temperature. The curves relative to each constituent reacting substantially in the same way, initiation definitely occurs from a given temperature. According to these curves, initiation occurs at about 300° C.

According to the invention, conversion increases at about 230° C.: 210° C. for CO, 230° C. for hydrocarbons and 250° C. for nitrogen oxides. This means that catalyst 4 becomes active from 230° C.

The invention thus allows lowering of the light-off of the catalyst in relation to the prior art.

Knowing the high pollutant emissions under cold conditions when the conventional redox catalyst is not active, the present invention is a very suitable original solution. It constitutes a means of reaching the future allowable emission limits. Furthermore, the future standards provide for a new emission reduction.

The table hereunder reproduces the European Commission Pollution standards for the years 2000 and 2005 for vehicles equipped with spark-ignition engines. HC and $NO_x$ emissions should thus be divided by two.

| (g/km) | CO | HC | $NO_x$ |
| --- | --- | --- | --- |
| 2000 | 2.3 | 0.2 | 0.15 |
| 2005 | 1.0 | 0.1 | 0.08 |

The present invention allows reaching the lowest levels considered.

We claim:

1. A depollution system which processes exhaust gas from a spark-ignition internal-combustion engine, comprising at least a first gas processing device including a three-way catalyst placed in an exhaust line, a second device in the exhaust line through which all the exhaust gas passes and are processed therein which eliminates by hydrogenation alkynes in the exhaust gas which interfere with operation of the three-way catalyst in removing pollutants from the exhaust gas, the second device being placed upstream from the first device in relation to a direction of propagation of the gases in the exhaust line and which lowers a temperature at which the first device starts eliminating the pollutants by catalysis relative to a temperature at which the first device starts eliminating pollutants by catalysis when alkynes are present in the exhaust gas.

2. A depollution system as claimed in claim 1, wherein the second device eliminates acetylene present in the exhaust gas.

3. A depollution system as claimed in claim 1, wherein the second device functions to eliminate the alkynes within the exhaust gas in a temperature range between 200° C. and 300° C.

4. A depollution system as claimed in claim 2, wherein the second device functions to eliminate the alkynes within the exhaust gas in a temperature range between 200° C. and 300° C.

5. A depollution system as claimed in claim 2, wherein the second device is a catalyst containing mainly palladium.

6. A depollution system as claimed in claim 3, wherein the second device is a catalyst containing mainly palladium.

7. A depollution system as claimed in claim 4, wherein the second device is a catalyst containing mainly palladium.

8. A depollution process which processes exhaust gas from a spark-ignition internal-combustion engine, comprising performing catalysis with a first device in an exhaust line, and upstream of the first device passing all the exhaust gas and processing all of the exhaust through a second device which eliminates by hydrogenation alkynes which inhibit the catalysis by the first device from the exhaust gas, the second device being placed upstream from the first device in relation to a direction of propagation of the gases in the exhaust line and which lowers a temperature at which the first device starts eliminating the pollutants by catalysis relative to a temperature at which the first device starts eliminating pollutants by catalysis when alkynes are present in the exhaust gas.

9. A depollution process as claimed in claim 8, wherein constituents inhibiting the catalysis are processed in the second device at temperatures below 300° C.

* * * * *